United States Patent [19]

Metcalf

[11] Patent Number: 4,685,550

[45] Date of Patent: Aug. 11, 1987

[54] QUICK DISCONNECT MECHANISM

[75] Inventor: Jeffrey D. Metcalf, Rockford, Ill.

[73] Assignee: Sundstrand Corporation, Rockford, Ill.

[21] Appl. No.: 780,678

[22] Filed: Sep. 26, 1985

[51] Int. Cl.$^4$ .............................................. F16D 11/10
[52] U.S. Cl. ................................... 192/67 R; 192/96; 74/665 B
[58] Field of Search ................. 192/67 R, 96, 101, 90, 192/84 C; 74/665 A, 665 B, 665 Q

[56] References Cited

U.S. PATENT DOCUMENTS

| | | | |
|---|---|---|---|
| 1,725,562 | 8/1929 | Borchert | 192/96 X |
| 2,757,768 | 8/1956 | Canderer | 192/67 R X |
| 2,772,578 | 12/1956 | Kling | 192/96 X |
| 3,091,316 | 5/1963 | Huffman | 192/96 X |
| 3,203,521 | 8/1965 | Frank | 192/96 X |
| 3,232,138 | 2/1966 | Burckhardt | 74/665 B |
| 3,918,560 | 11/1975 | Zach, Jr. | 192/114 |
| 4,043,226 | 8/1977 | Buuck | 192/67 R X |
| 4,269,293 | 5/1981 | Martin | 192/67 R X |
| 4,293,060 | 10/1981 | Miller | 192/84 C X |
| 4,303,151 | 12/1981 | Kolacz | 192/114 |
| 4,445,596 | 5/1984 | Waters et al. | 188/171 |

Primary Examiner—William F. Pate, III
Assistant Examiner—Creighton Smith

Attorney, Agent, or Firm—Wood, Dalton, Phillips, Mason & Rowe

[57] ABSTRACT

In an actuation system having a pair of motors simultaneously operable for driving a movable member through a torque-summing gear box, there is a need to have a simply constructed, minimal cost, light weight quick disconnect mechanism operable to disconnect a motor which has failed fixed so that the other motor can continue to operate. The quick disconnect mechanism utilizes a tapered jaw clutch connecting driving and driven elements in the drive train between the motor and the torque-summing gear box, a ball detent mechanism for holding the clutch either engaged or disengaged and a short duty cycle solenoid. The solenoid can be momentarily energized to release the ball detent mechanism to permit an axial force derived from the driven member being back driven to separate the clutch and thereafter, the solenoid is de-energized to enable the ball detent mechanism to maintain the clutch disengaged. The solenoid is only momentarily operable to release first locking means including the ball detent mechanism to enable disengagement of the clutch and thereafter is de-energized to enable second locking means including the ball detent mechanism to hold the clutch disengaged and without necessity of continuous energization of the solenoid during the entire time in which the clutch is held disengaged.

2 Claims, 3 Drawing Figures

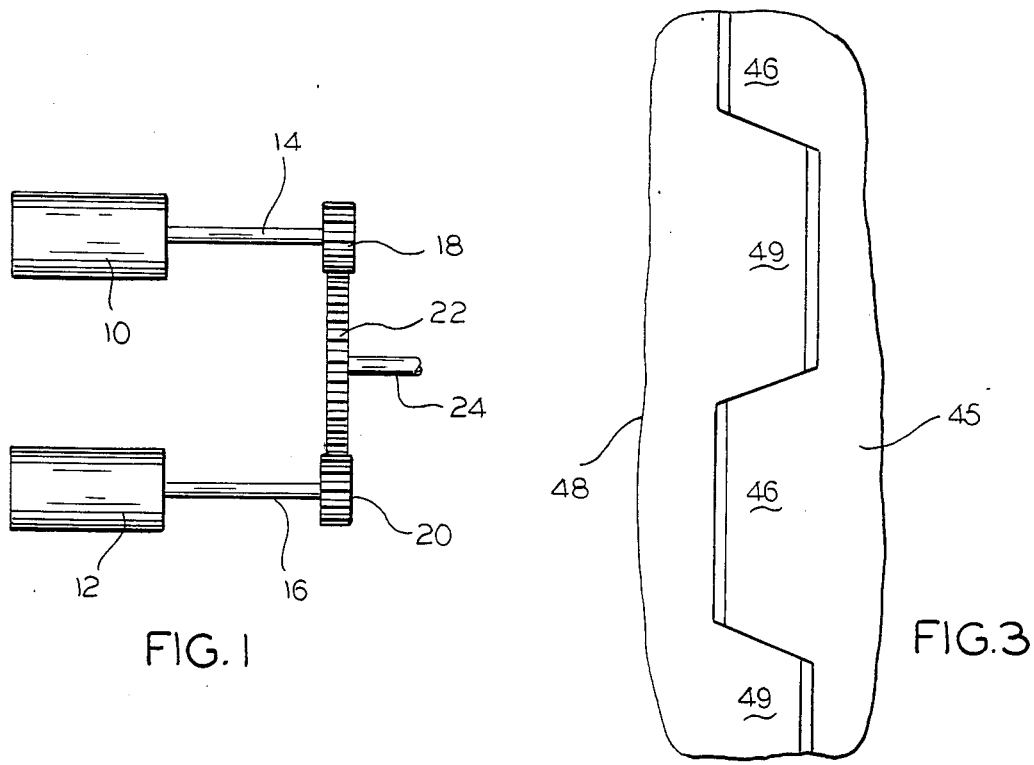
FIG. 1
FIG. 3
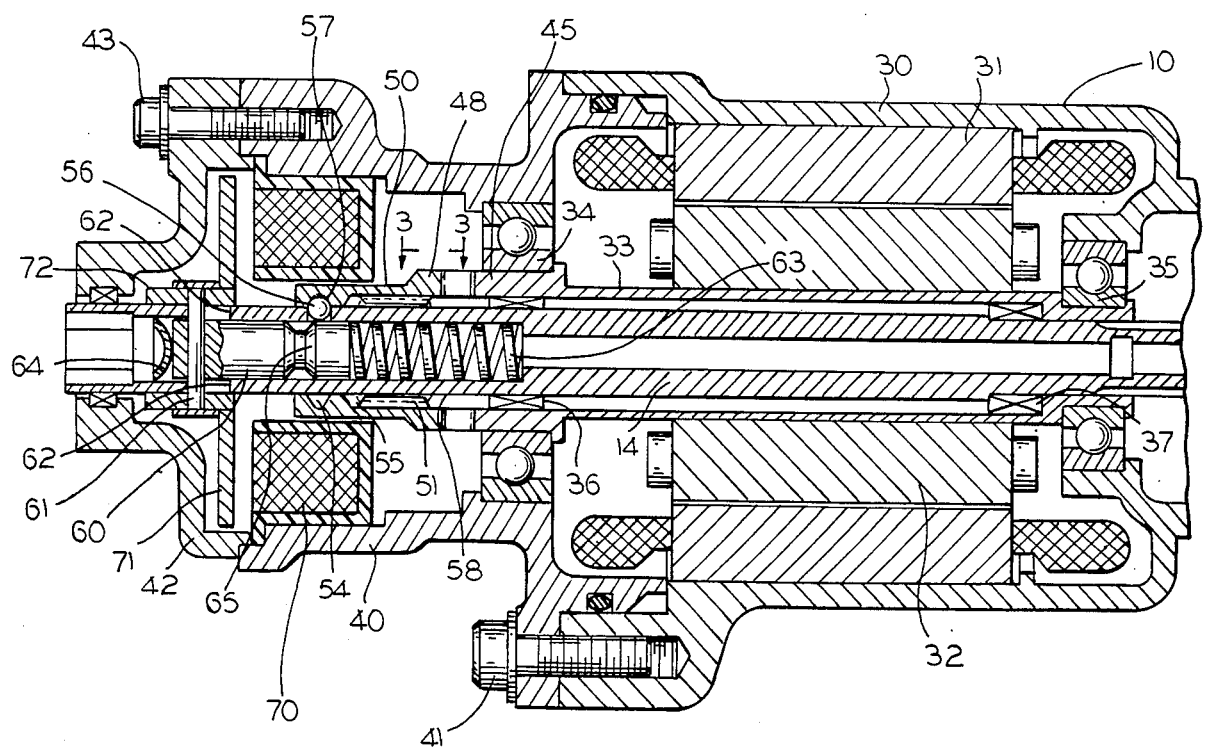
FIG. 2

QUICK DISCONNECT MECHANISM

DESCRIPTION

1. Technical Field

This invention pertains to quick disconnect mechanism for an actuation system having a pair of drive motors driving an output shaft through a torque-summing gear box. Actuating systems for aircrafts for positioning of a flight control surface such as a flap may use a pair of drive motors to drive an actuator. It is necessary to assure a continued drive if one motor should fail. The most economical connection for such motors for driving an output is through a torque-summing gear box which requires the disconnection of a failed fixed motor from the drive train in order to assure that the other motor can continue to operate the actuator. The quick disconnect mechanism should function as simply as possible with high reliability and be of minimum weight which is achieved by the quick disconnect mechanism disclosed herein. The quick disconnect mechanism can have utility in applications other than that just described.

2. Background Art

Actuating mechanisms for aircraft flight control surfaces such as a wing flap are well known in the art with one type of actuator having a rotatable ball nut which is rotated to cause linear movement of a ball screw connected to the wing flap. In certain applications, it is necessary to provide a redundant power source for the actuator and this has been achieved by use of a pair of drive motors drivingly connected to the ball nut. This connection can be either through a torque-summing gear box or a speed summing gear box with the torque-summing gear box being the simpler construction of the two and therefore being less costly. In the torque-summing gear box, both drive motors have their outputs connected to a gear of the torque-summing gear box and thus the interconnecting gear prevents rotation of one motor if the other motor should fail fixed, that is, seized and therefore prevented from rotating.

It has been known to provide disconnect mechanism to disconnect the seized motor from the torque-summing gear box whereby the other motor can continue to operate and move the actuator. Typical of such known prior disconnect mechanism is a clutch mechanism in the drive from a motor to the torque summing gear box. A movable clutch member is connected by a yoke or other structure to a solenoid and when a seized motor condition is detected, the solenoid is operated to move the yoke to disconnect the clutch and the solenoid remains operative to maintain the clutch disengaged. This structure requires bearing means to associate the yoke with a rotating clutch member and a heavy duty solenoid to disengage the clutch which is under torque from the back driving from the torque-summing gear box and which must continue energized during the time interval that the clutch is disengaged.

Prior art of possible relevance includes the Huffman U.S. Pat. No. 3,091,316, Zach U.S. Pat. No. 3,918,560, Kolacz U.S. Pat. No. 4,303,151 and Waters U.S. Pat. No. 4,445,596.

The prior art does not disclose a quick disconnect mechanism for disconnecting a driven member from a driving member when the driving member is prevented from rotating and the driven member is back driven which utilizes a tapered jaw clutch interconnecting the driving and driven members, a ball detent mechanism for holding the clutch either engaged or disengaged, and structure including a short duty cycle momentarily energized solenoid for operating ball detent mechanism to release the clutch for disengagement and thereafter hold the clutch disengaged.

DISCLOSURE OF THE INVENTION

A primary feature of the invention is to provide a quick disconnect mechanism for disconnecting a failed fixed driving member from a driven member which is back driven, which is of a simple construction and of minimal weight and which provides high reliability in operation. The invention has particular utility in an actuation system wherein two motors are connected to a torque-summing gear box for driving an output member and when one motor fails fixed, the quick disconnect mechanism disconnects the failed motor from the drive train to allow the remaining motor to drive the output member.

In accomplishing the foregoing, the quick disconnect mechanism has a tapered jaw clutch interconnecting a motor to the torque summing gear box with a ball detent mechanism for holding the clutch either engaged or disengaged and means including a short duty cycle solenoid for operating the ball detent mechanism to release the clutch for disengagement and thereafter the solenoid is de-energized and the ball detent mechanism holds the clutch disengaged.

An object of the invention is to provide a new an improved quick disconnect mechanism which is associated with rotatable structure without the requirement for added bearings, which has a minimum number of components with minimal weight, and which has high reliability.

Still another object of the invention is to provide a quick disconnect mechanism for an actuation system wherein a pair of drive motors drive an output member through a torque-summing gear box and which is operable when one motor fails fixed to disconnect the failed motor from the drive train to enable the other motor to continue to drive the output member and wherein the quick disconnect mechanism is operable through the momentary energization of a solenoid to effect the disconnect and thereafter the disconnection is maintained without continued energization of the solenoid.

An additional object of the invention is to provide a quick disconnect mechanism for disconnecting a seized driving member from a driven member which is back driven comprising a clutch mechanism between said driving and driven members, means including a movable lock member having two positions with one position holding the clutch either engaged or disengaged and the other position freeing the clutch for disengaging movement, and means including a momentarily energized solenoid operable when the driving member is seized to sequentially move the movable lock member from said one position to the other position and back to said one position.

Still another object of the invention is to provide an actuation system utilizing a torque-summing gear box driven by a pair of motors and quick-disconnect mechanism for disconnecting a seized motor from the torque-summing gear box, comprising, driving and driven elements in a drive train between the motor and the torque-summing gear box, disengageable clutch means between said driving and driven elements, first locking means for holding the clutch means engaged, second locking means for holding the clutch means disengaged, and means including a momentarily-energized solenoid and a lock member moved thereby for disabling the first locking means to enable clutch disengagement and thereafter enable said second locking means.

Still another object of the invention is to provide a quick disconnect mechanism as defined in the preceding paragraph wherein the first and second locking means comprise a ball and a pair of ball release slots.

A further object of the invention is to provide disconnect mechanism as defined in the preceding paragraph wherein the disengageable clutch means is a tapered jaw clutch.

A further object of the invention is to provide disconnect mechanism as defined in the preceding paragraph wherein a sleeve is splined to the driven element and the tapered jaw clutch has engaging jaws on the sleeve and the driving element.

BRIEF DESCRIPTION OF THE DRAWINGS

FIG. 1 is a schematic view showing a pair of motors associated with a torque-summing gear box;

FIG. 2 is a central vertical section through one of the motors and showing the quick disconnect mechanism associated therewith; and FIG. 3 is a section taken generally along the line 3—3 in FIG. 2 and on an enlarged scale.

BEST MODE FOR CARRYING OUT THE INVENTION

The quick disconnect mechanism is disclosed as having particular utility for an actuation system utilizing two separate motors that are connected through a torque-summing gear box for driving an output member. As seen in FIG. 1, a pair of motors 10 and 12 have their respective output shafts 14 and 16 each provided with the respective gears 18 and 20 which mesh with a gear 22 on a shaft 24 which can be connected to a movable member such as the ball nut of a ball screw actuator. The motors 10 and 12 can be either hydraulic or electric motors with the particular embodiment of motor shown in FIG. 2 being an electric motor. When both of the motors 10 and 12 are operating, rotation is imparted thereby to the output shaft 24 and with there being torque-summing through the gear 22. Since both of the motors are directly connected to the gear 22, it is not possible to rotate the output shaft 24 if one of the motors should fail fixed. A fail fixed motor is a seized motor which prevents rotation of its output shaft and thus prevents rotation of the gear 22. The quick disconnect mechanism disclosed herein provides for disconnection of the seized motor from the drive train whereby the other motor can continue to operate and drive the output shaft 24 through the gear 22.

The motor 10 is particularly shown in FIG. 2 and has a case 30 mounting a stator 31. A rotor 32 is fixed to a tubular member 33 forming a driving member and which is rotatably mounted within the motor case by bearings 34 and 35. The motor 10 has the output shaft 14 defining a driven member. The output shaft 14 is rotatably supported within the tubular member 33 by means of a pair of bearings 36 and 37.

A housing 40 secured to an end of the motor case 30 as by fastening means 41 has a cover 42 secured thereto by fastening member 43 and this structure houses the quick disconnect mechanism.

The quick disconnect mechanism includes a tapered jaw clutch shown particularly in FIG. 3 having interfitting jaws on a pair of clutch members. One of the clutch members 45 has the tapered jaws 46 and is formed integrally with and at an end of the tubular member 33. The other clutch member 48 has the tapered jaws 49 and is formed integrally with a sleeve 50 which is splined at 51 to the driven member defined by the output shaft 14 whereby the sleeve 50 is connected thereto for rotation while being able to move lengthwise thereof.

With the parts thus far described and as shown in FIG. 2, operation of the motor 10 results in rotation of the output shaft 14 by rotation of the tubular member 33 which rotates the splined sleeve 50 through the tapered jaw clutch.

The quick disconnect mechanism further includes first locking means for holding the tapered jaw clutch engaged and second locking means for holding the clutch disengaged. These locking means comprise a pair of V-shaped ball release slots 54 and 55 formed on the interior of the sleeve 50, a plurality of circumferentially spaced balls 56, one of which is seen in FIG. 2 and a plurality of circumferentially spaced ball slots, one of which is shown at 57 for each receiving one of the balls 56 and which is formed in a wall 58 of a tubular part of the output shaft 14 which defines a recess for structure to be described. With the ball 56 positioned as shown in FIG. 2, it is fully seated in the ball relief slot 54 and acts to lock the clutch members of the tapered jaw clutch in engaged relation. With the sleeve 50 shifted toward the left as viewed in FIG. 2, to place the ball 56 in the ball relief slot 55, the tapered jaws 46 and 49 are out of engagement and the clutch is disengaged.

The ball 56 is caused to be fully seated in either of the ball relief slots 54 and 55 by a lock member 60 in the form of a plunger which is movable longitudinally of the output shaft 14 and loosely fitted within the recess defined by the shaft wall 58. The lock member 60 has limited longitudinal movement within the recess as controlled by a pin 61 extended therethrough and which can move back and forth within the dimensions of openings 62 formed in the shaft wall 58. The lock member is urged to the position shown by a spring 63 fitted at the base of the recess and against a bumper 64. The lock member 60 also has a ball relief slot 65 which is in an inoperative position as seen in FIG. 2 whereby the full diameter of the lock member underlies the ball. The ball has a diameter greater than the thickness of the wall 58 of the shaft so that the ball is fully seated in one of the ball relief slots of the sleeve 50.

A short duty cycle solenoid 70 is mounted within the housing 40. An armature plate 71 has an annular section 72 connected to the lock member 60 through the pin 61. Energization of the solenoid 70 draws the armature plate 71 towards the right to shift the lock member 60 to the right against the spring 63 which brings the ball relief slot 65 of the lock member into alignment with the ball slots 57 in the wall 58 of the output shaft 14 whereby the balls 56 can fall into the ball relief slot 65 of the lock member and move out of one or the other of the ball relief slots 54 and 55.

In normal operation, the motors 10 and 12 drive the output shaft 24 through their respective output shafts 14 and 16. When a conventional sensing mechanism (not shown) senses a failed fixed motor which cannot drive its output shaft, the solenoid 70 of that particular motor is momentarily energized to attract the armature plate 71 which moves the lock member 60 to the right to align the ball relief slot 65 thereof with the ball slots 57. The balls 56 can fall inwardly into the ball relief slot 65 as assisted by the camming action of the ball relief slot 54 of the sleeve 50 which is being urged toward the left, as viewed in FIG. 2, by axial forces derived from the tapered jaw clutch resulting from the output shaft 14 being back driven from the torque-summing gear box. The axial force urging the sleeve 50 toward the left brings the ball relief slot 55 into alignment with the ball slots 57 and with the solenoid 70 only being momentarily energized, the spring 63 can move the lock member 60 to the left back to the position shown in FIG. 2 wherein the full diameter of the lock member to the right of the ball relief slot 65 positions the balls 56 fully seated in the ball relief slots 55 to hold the clutch disengaged. There is full disengagement of the clutch teeth 46 and 49 because of a camming action of the balls in the ball relief slot 55 to move the sleeve 50 a sufficient distance to maintain the jaws out of contact. The amount of axial force exerted on the sleeve by the jaws of the clutch is produced by the taper built into the jaws. With the clutch disengaged, the other motor can continue to operate the movable member through the torque-summing gear box.

The solenoid 70 need only be energized for a short period of time, and therefore its size can be greatly reduced over the size of the solenoid that would be continuously energized to maintain clutch disengagement. The maintenance of the clutch, either engaged or disengaged, is through mechanically interacting structure with the solenoid 70 only being momentarily operable to release the first locking means including the balls 56 and ball relief slot 54 which holds the clutch. After the tapered jaw clutch has disengaged, the solenoid is de-energized to enable the second locking means including the balls 56 and the ball relief slot 55 to hold the clutch disengaged.

I claim:

1. A quick-disconnect mechanism for disconnecting rotatable driving and driven elements when the driving element cannot rotate and the driven element is back driven comprising, a shaft defining the driven element, a tubular member surrounding the shaft and defining the driving element, a recess at an end of said shaft, a ball slot in a shaft wall surrounding said recess, a ball in said slot having a diameter greater than the thickness of said wall, a lock member movably guided in said recess for limited movement lengthwise of said shaft and having a ball relief slot, a sleeve surrounding said wall and splined to said shaft for movement lengthwise thereof and rotation therewith, a tapered jaw clutch connecting said sleeve to said tubular member, a pair of ball relief slots formed interiorly of said sleeve and spaced lengthwise thereof for alternate coaction with said ball, and means for positioning said lock member in either a release position with the ball relief slot of the lock member aligned with said ball slot or a locking position with the ball relief slot of the member out of the alignment with the ball slot, one of said pair of ball reliefs slots in said sleeve coacting with the ball in the ball slot to hold the tapered jaw clutch engaged and the other of said pair of ball relief slots coacting with the ball in the ball slot to hold the jaw clutch disengaged.

2. A quick-disconnect mechanism as defined in claim 1 wherein said means for positioning said lock member includes a solenoid for moving the lock member to release position and a spring acting in opposition to the solenoid for urging the lock member to said locking position.

* * * * *